United States Patent
Rao et al.

(10) Patent No.: US 10,430,291 B1
(45) Date of Patent: Oct. 1, 2019

(54) EFFECTIVE METHOD TO BACKUP VMS IN LARGER VM INFRASTRUCTURE

(71) Applicant: EMC IP Holding Company LLC, Hopkinton, MA (US)

(72) Inventors: Naveen Rao, Bangalore (IN); Anupam Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 15/727,308

(22) Filed: Oct. 6, 2017

(51) Int. Cl.
*G06F 9/455* (2018.01)
*G06F 11/14* (2006.01)

(52) U.S. Cl.
CPC ...... *G06F 11/1464* (2013.01); *G06F 9/45558* (2013.01); *G06F 2009/45583* (2013.01); *G06F 2009/45595* (2013.01); *G06F 2201/815* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2015/0193312 A1* | 7/2015 | Nanivadekar | G06F 11/1458 707/654 |
| 2018/0067819 A1* | 3/2018 | Kotha | G06F 11/1464 |

* cited by examiner

*Primary Examiner* — Charlie Sun
(74) *Attorney, Agent, or Firm* — Womble Bond Dickinson (US) LLP

(57) ABSTRACT

One embodiment is related to a method for coordinating virtualized proxy node based virtual machine (VM) backups, comprising: determining one or more strategies for coordinating a plurality of virtualized proxy nodes for VM backup; and initiating one or more virtualized proxy node based VM backups based on the determined one or more strategies.

21 Claims, 9 Drawing Sheets

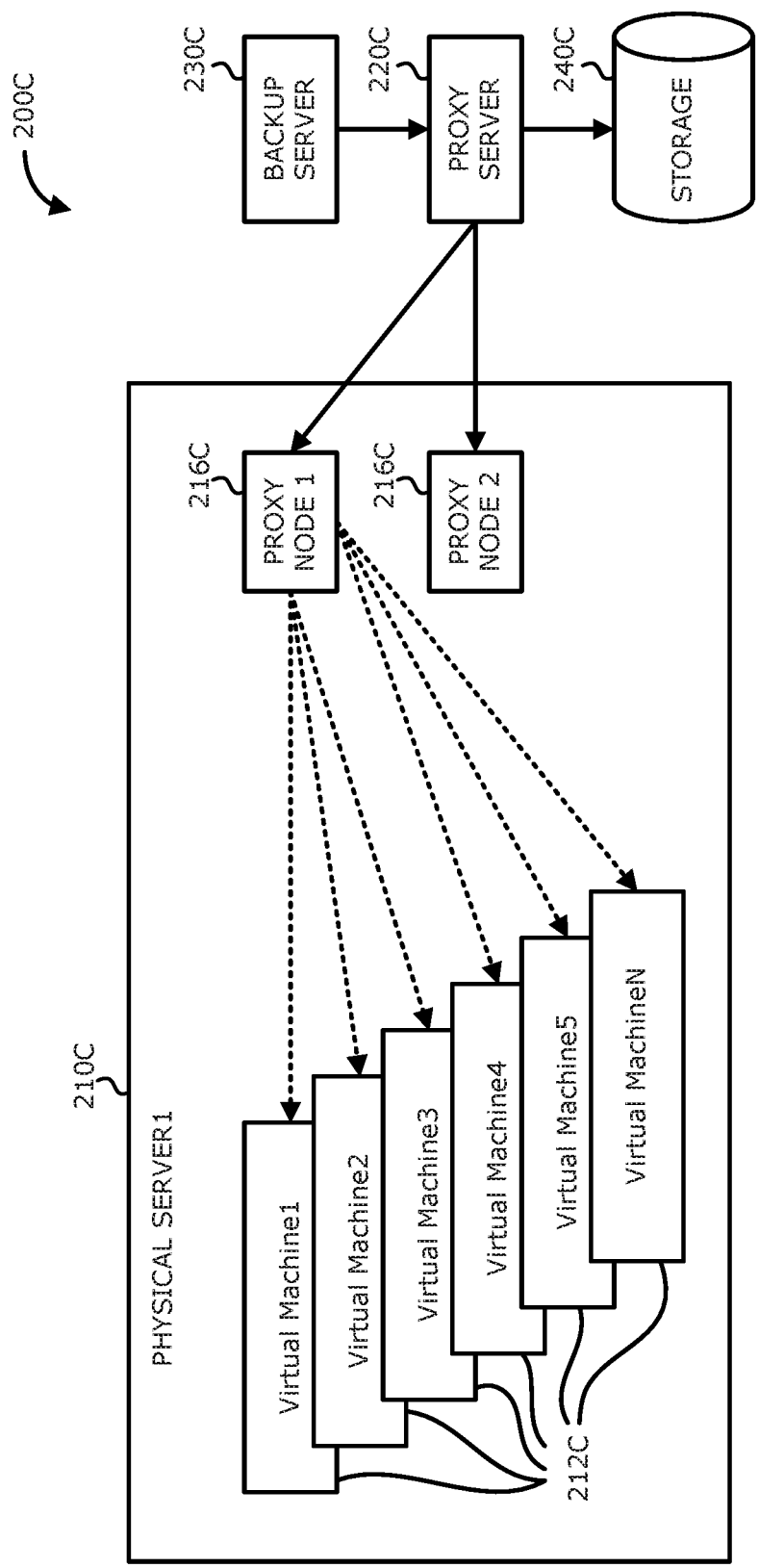

EFFECTIVE METHOD TO BACKUP VMS IN LARGER VM INFRASTRUCTURE

FIELD OF THE INVENTION

Embodiments of the disclosure are related to electronic devices, and more particularly, to a method, apparatus, and system for backing up virtual machines with virtualized proxy nodes.

BACKGROUND

In a backup environment, a proxy server and proxy nodes may be deployed on top of a hypervisor layer. A backup server may communicate with the proxy server and may be responsible for starting backups. The backup server may store the metadata in its catalog. The metadata can be used to effectively determine the conditions including strengths and problems in a physical host that is hosting virtual machines. If the backup server and the proxy server are capable of performing backups, but the physical host is running low on system resources, backups and restores may eventually fail even if they have been scheduled.

In a large virtual machine (VM) infrastructure, many physical hosts manage a variety of VMs, and backing up each VM in such an environment can make backup management cumbersome. Usually the proxy server with its external proxy nodes manages and backs up the VM infrastructure. But with the limitation on concurrent backups, the association of proxy nodes to a hypervisor also plays a crucial role in a VM backup. Thus, in a larger VM environment, effective backup management may become difficult.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention are related to a method for coordinating virtualized proxy node based virtual machine (VM) backups, comprising: determining one or more strategies for coordinating a plurality of virtualized proxy nodes for VM backup; and initiating one or more virtualized proxy node based VM backups based on the determined one or more strategies.

Figure 1:
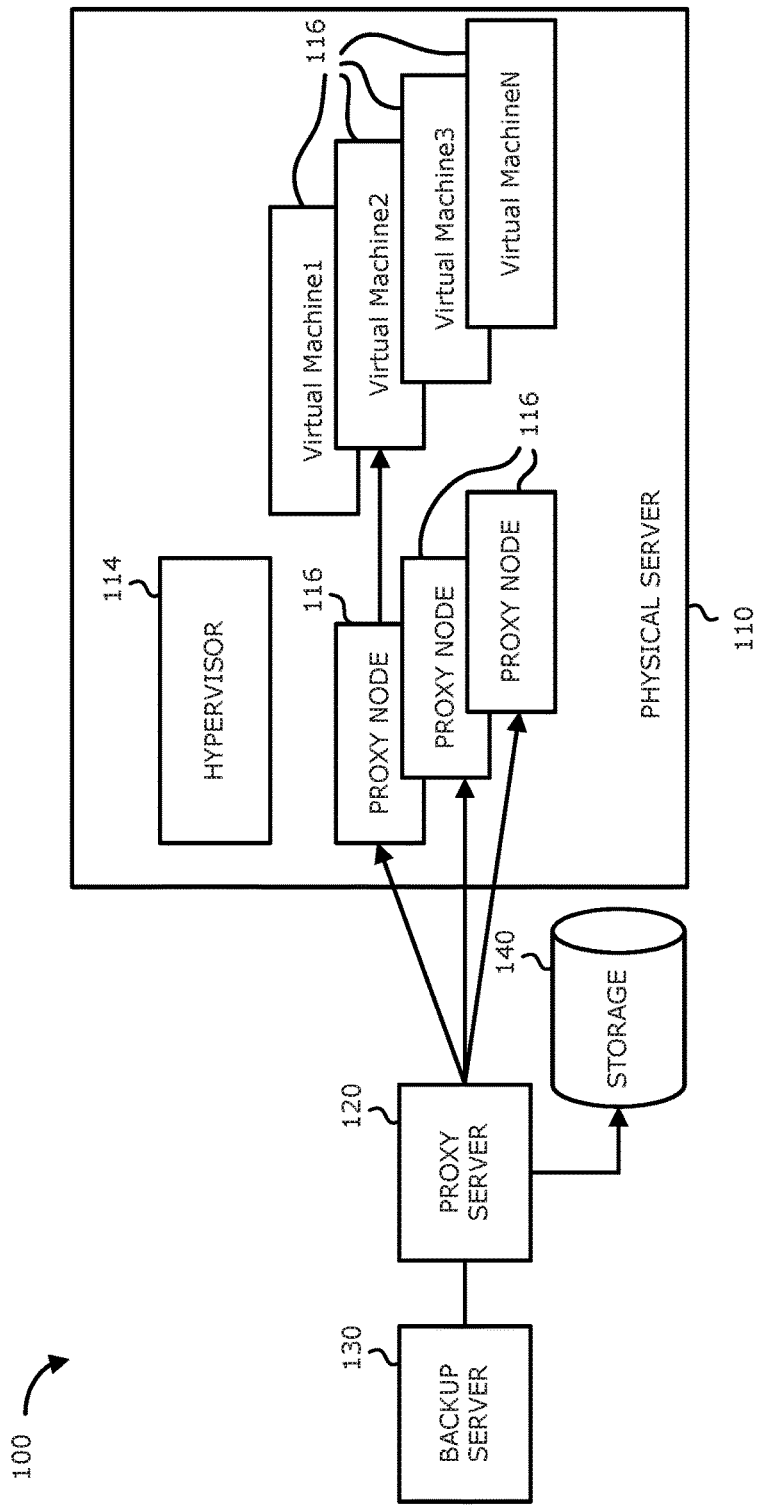
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 may comprise one or more physical servers 110. Each of the physical servers 110 can host or support more than one virtual machine 112. A hypervisor layer 114 may be running on physical servers 110 and the virtual machines 112 may be running on the hypervisor layer 114.

The environment 100 may also include a proxy server 120, which may be implemented as a virtual machine. The proxy server 120 may be running on a physical server 110 as well or may be a computing device. The proxy server 120 may be configured to manage the backup of the virtual machines 110.

The proxy server 120 may cooperate with a backup server 130 and one or more proxy nodes 116 (which are running on the hypervisor layer 114 of the physical servers 110) to generate and store backups of the virtual machines 110 in a storage 140. The proxy server 120 can manage multiple proxy nodes 116.

Necessary communication can be made between physical servers 110 including virtual machines 112 and proxy nodes 116, the proxy server 120, the backup server 130, and the storage 140 through a network.

When a backup operation is performed in the environment 100, the proxy server 120 can coordinate the backup operation with the backup server 130. The proxy server 120 may also coordinate with the proxy nodes 116 and the proxy nodes 116 may perform the actual backup operation.

When a backup operation is initiated, the proxy server 120 may instruct at least one proxy node 116 to perform a backup operation. The proxy node 116 may then identify the virtual machines 112 for which a backup has requested by the backup server 130. The proxy node 116 may back up one or more virtual machines 112 at a time. In one embodiment, a single proxy node 116 may back up 8 virtual machines 112 concurrently. Moreover, the proxy server 120 may manage multiple proxy nodes 116 across different physical servers 110. Irrespective of the number of physical servers 110 present, there may be an upper limit to the number of proxy nodes 116 the proxy server 120 is able to utilize. In one embodiment, the proxy server 120 may manage 5 proxy nodes 116 at most.

On one hand, each proxy node 116 may back up one or more virtual machines at a time. On the other hand, the association between the proxy nodes 116 and the VMs 112 they protect may be random, especially when multiple concurrent backups are being performed. As an example, if 2 proxy nodes 116 are utilized by the proxy server 120, and each proxy node 116 can back up 8 VMs 112 concurrently (i.e., 8 concurrent threads), the proxy server 120 is capable of backing up 16 (8×2) VMs 112 at a time. With this many VMs 112 being backed up at the same time, the default, random mapping between the proxy nodes 116 (and their threads) and the VMs 112 may introduce inefficiencies in the backup operation, especially in a larger environment where the VMs 112 and the proxy nodes 116 are spread across multiple physical servers 110. The inefficiencies may be most apparent when for a large number of proxy nodes 116, the threads of each proxy node 116 are mapped to VMs 112 that are hosted across different physical servers 110.

First Embodiment

Figure 2A:
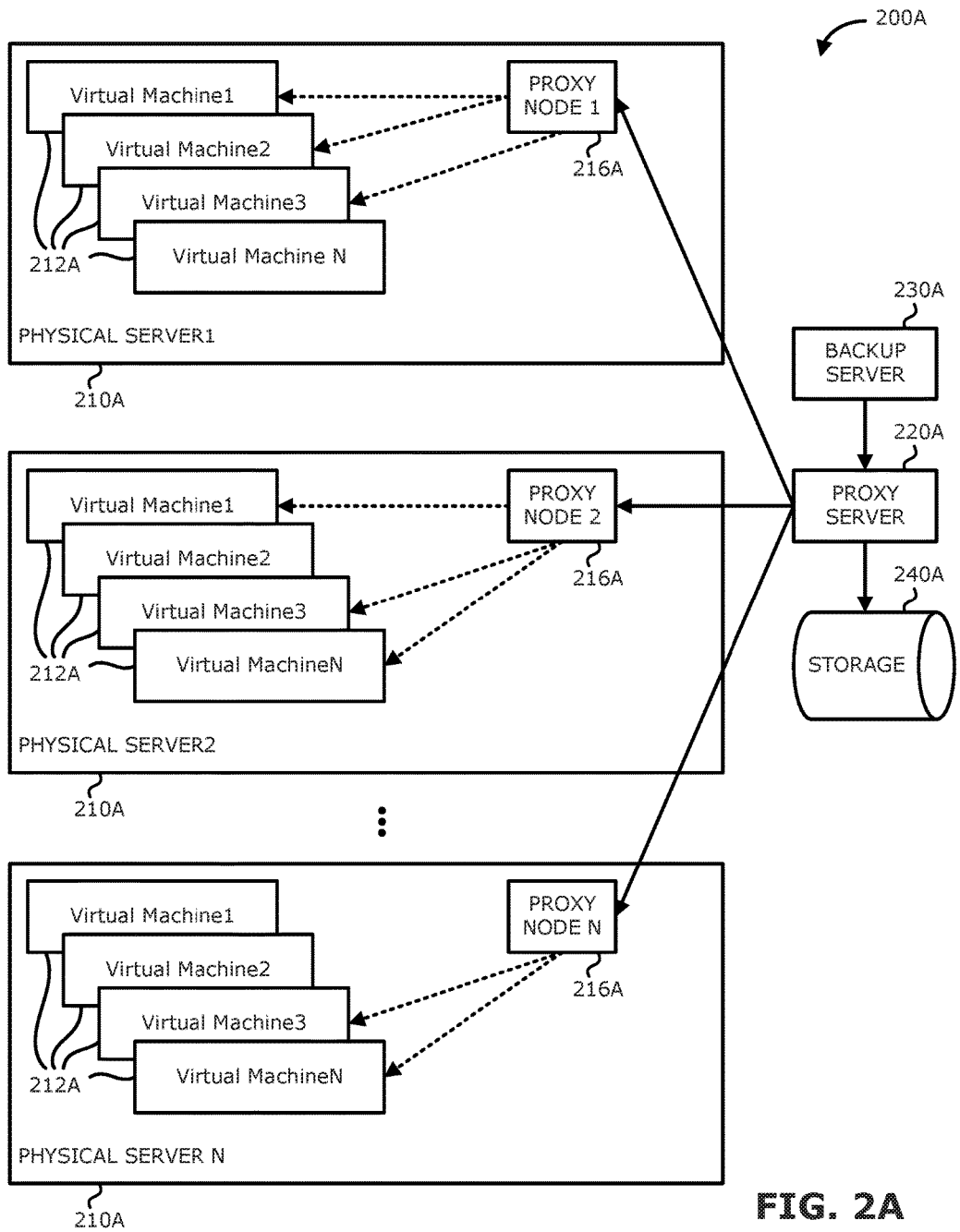
FIG. 2A is a block diagram illustrating an example environment in which the first embodiment of the invention may be practiced.

Referring to FIG. 2A, a block diagram illustrating an example environment 200A in which the first embodiment of the invention may be practiced is shown. In this embodiment, for each physical server 210A that has a VM 212A that needs backing up, at least one proxy node 216A is spawned within the same physical server 210A. The threads of each proxy node 216A are mapped only to VMs 212A that reside within the same physical server 210A as the proxy node 216A. Backup efficiency may be improved because by restricting proxy nodes 216A to the backing up of VMs 212A within the same physical server 210A, excessive and unnecessary network traffic can be avoided.

Second Embodiment

Figure 2B:
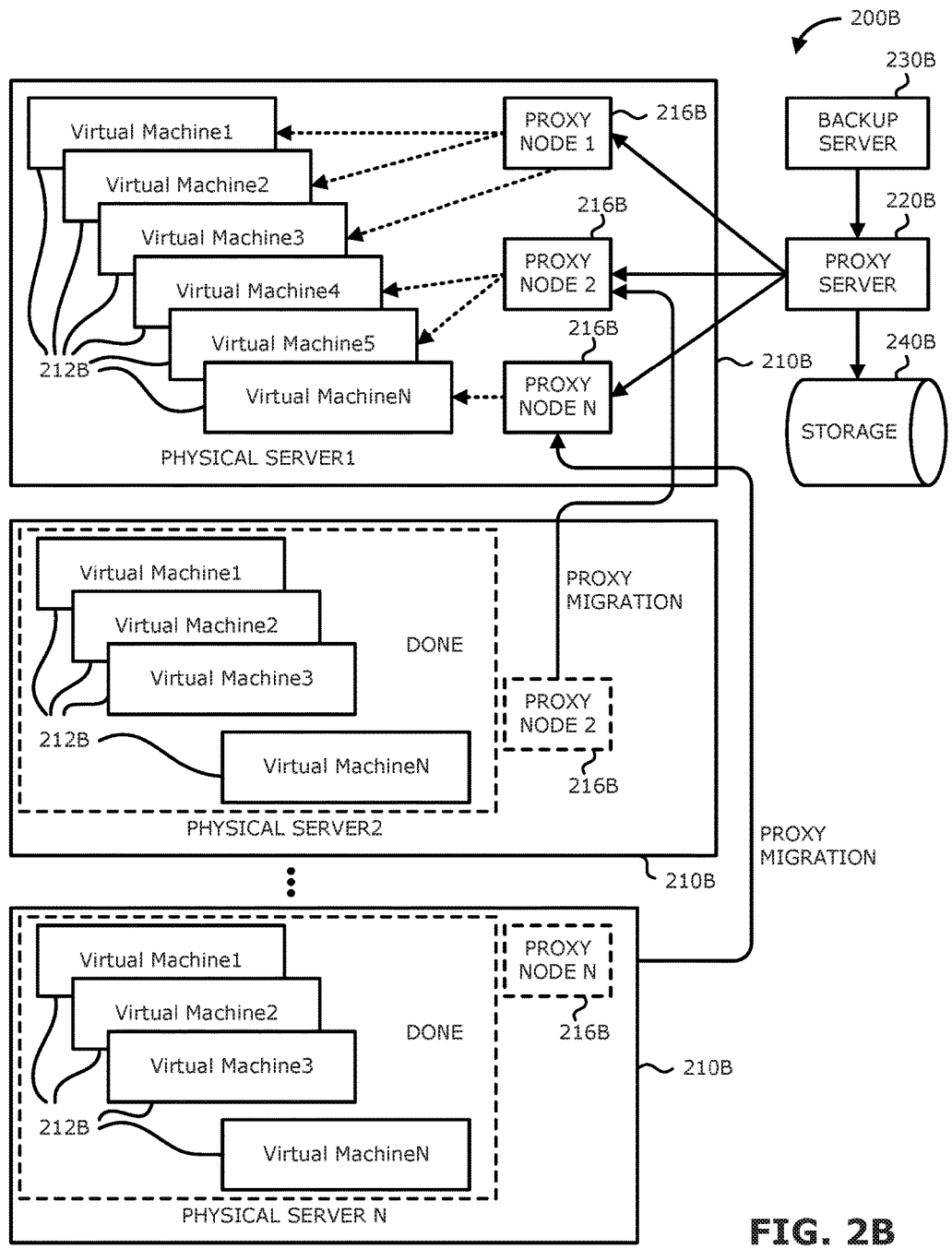
FIG. 2B a block diagram illustrating an example environment in which the second embodiment of the invention may be practice FIG. 2C a block diagram illustrating an example environment in which the third embodiment of the invention may be practice FIG. 2D a block diagram illustrating an example environment in which the fourth embodiment of the invention may be practice FIG. 2E a block diagram illustrating an example environment in which the fifth embodiment of the invention may be practice

Referring to FIG. 2B, a block diagram illustrating an example environment 200B in which the second embodiment of the invention may be practiced is shown. In this embodiment, proxy nodes 216B that reside in physical servers 210B that do not have VMs 212B that need backing up may be migrated to physical servers 210B that do have VMs 212B that need backing up. Then, once migrated, the proxy node 216B may start backing up VMs 212B within the same physical server 210B. Therefore, proxy nodes 216 do not have to lay idle within physical servers 210B that do not have VMs 212B that need backing up: these proxy nodes 216B can be migrated to physical servers 210B where they are needed.

Third Embodiment

Referring to FIG. 2C, a block diagram illustrating an example environment 200C in which the third embodiment of the invention may be practiced is shown. In this embodiment, the use of additional proxy nodes 216C is avoided if one or more already active proxy nodes 216C have not been saturated. For example, if a first proxy node 216C is already backing up 3 VMs 212C, and an additional 3 VMs 212C require a backup, assuming each proxy node 216C can back up 8 VMs 212C concurrently, the additional 3VMs 212C may be handled by the already active first proxy node 216C instead of another currently idle proxy node 216C. Compared to random assignment of backup tasks, aiming to utilize the currently active proxy node first may reduce system resources required.

Fourth Embodiment

Figure 2D:
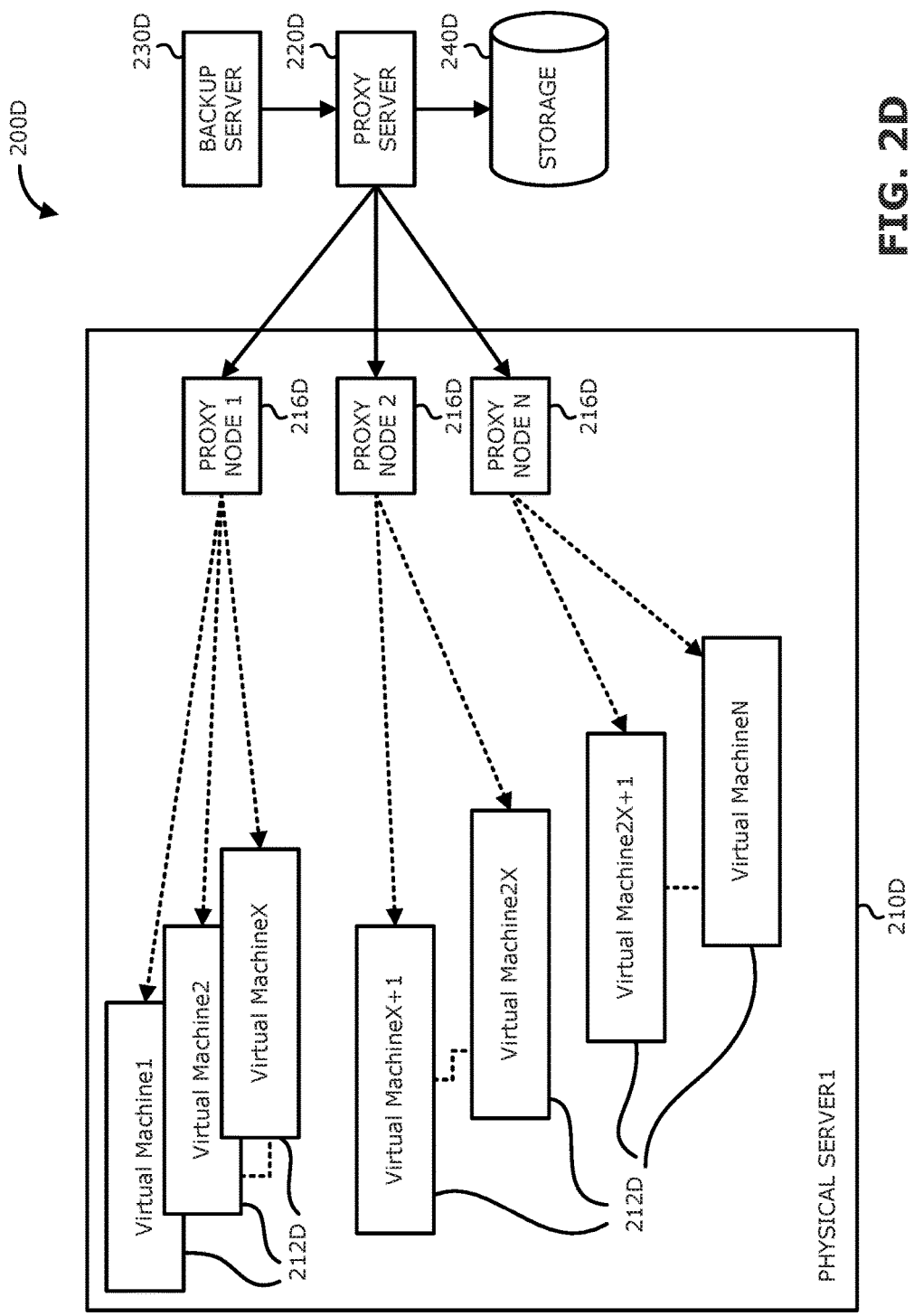

Referring to FIG. 2D, a block diagram illustrating an example environment 200D in which the fourth embodiment of the invention may be practiced is shown. In this embodiment, if the number of VMs 212D that need backing up can more than saturate all proxy nodes 216D within the same physical server 210D, then the VMs 212D may be equally divided among the proxy nodes 216D. For example, if 3 proxy nodes 216D are utilized and each proxy node 216D can back up 8 VMs 212D concurrently (i.e., the proxy nodes 216D can be saturated by the backing up of 24 VMs 212D), and 100 VMs 212D require a backup, the 100VMs 212D may be equally divided among the 3 proxy nodes 216D.

Fifth Embodiment

Figure 2E:
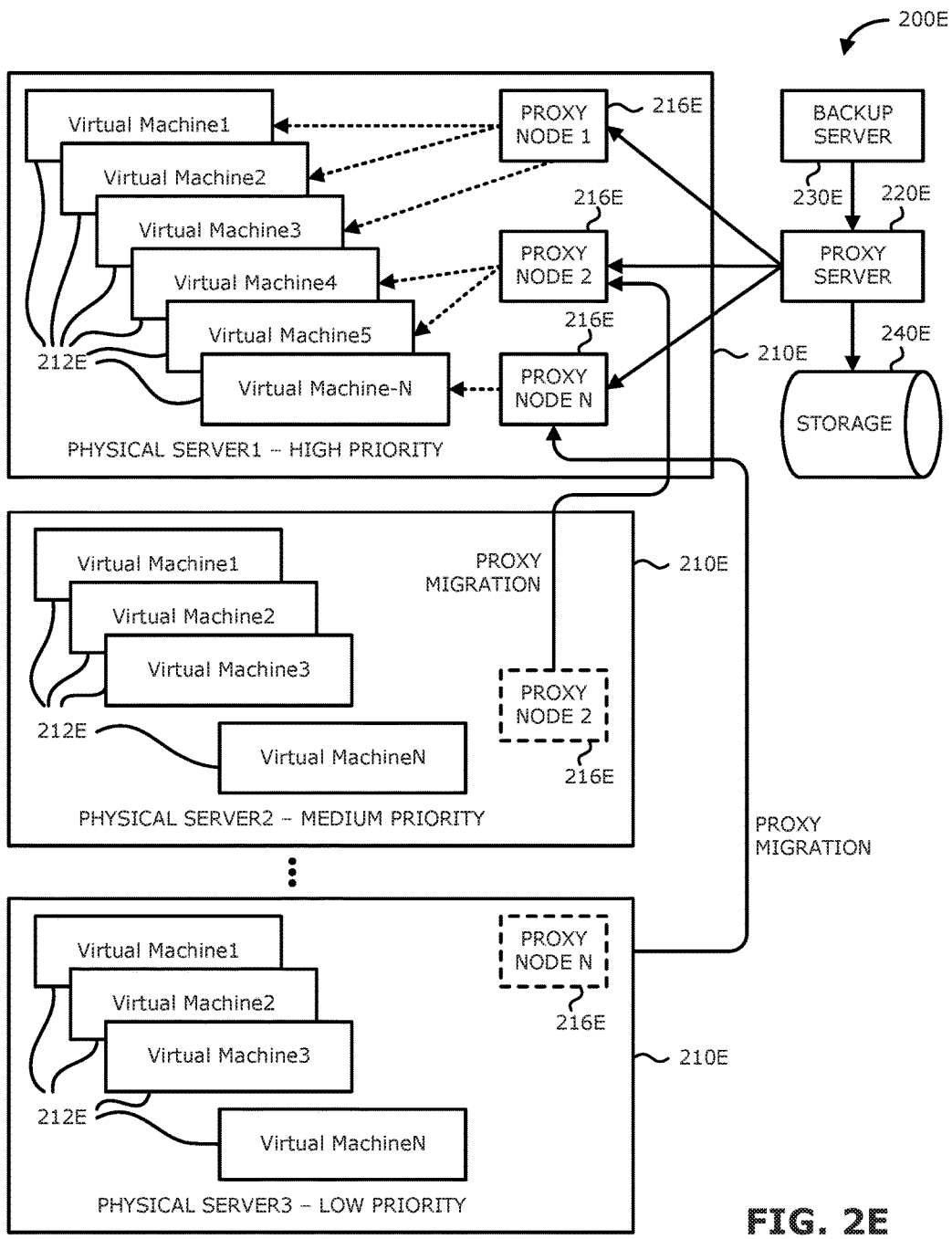

Referring to FIG. 2E, a block diagram illustrating an example environment 200E in which the fifth embodiment of the invention may be practiced is shown. In this embodiment, the different physical servers 210E may be associated with different priority levels, and physical servers 210E with higher priority levels are prioritized. If a physical server 210E with a higher priority level has at least one VM 212E that is waiting to be backed up but is not being handled by a proxy node 210E, one or more proxy nodes 216E residing in a physical server 210E that has a lower priority level may be migrated to the physical server 210E with the higher priority level to help fulfill the backup requests there first.

Therefore, different embodiments of the invention relate to different strategies for coordinating virtualized proxy node based virtual machine (VM) backups. For example, the strategies may comprise migrating the proxy nodes 116 between physical servers 110 and assigning particular VM 112 backup tasks to particular proxy nodes 116. Compared to random mapping or assignment, these strategies are believed to improve backup efficiency.

Figure 3:
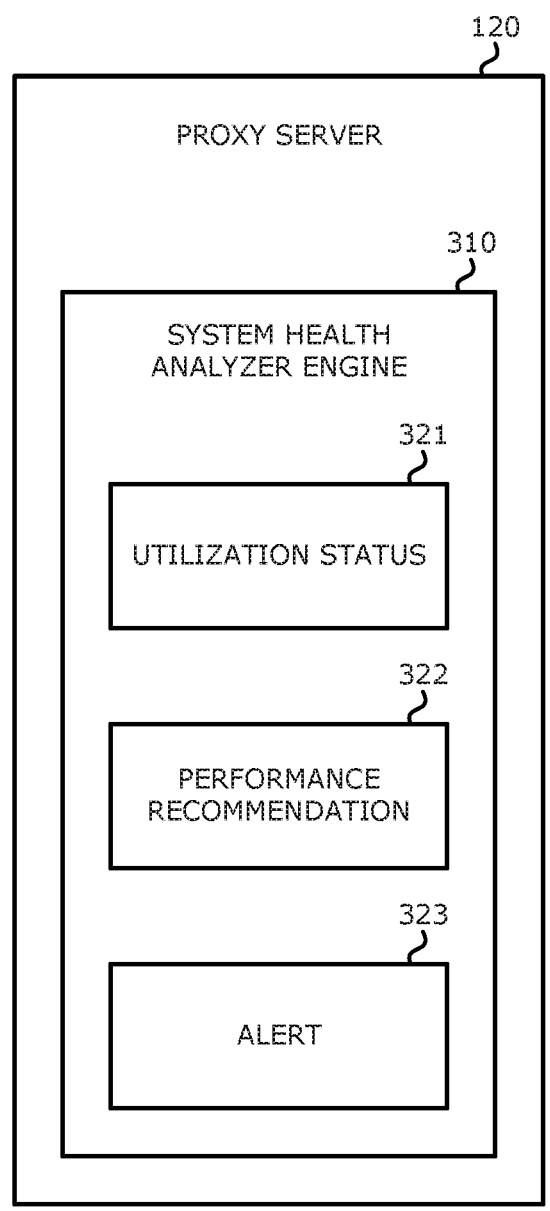
FIG. 3 is a block diagram illustrating an example proxy server according to an additional embodiment of the invention.

Referring to FIG. 3, a block diagram illustrating an example proxy server 120 according to an additional embodiment of the invention is shown. The proxy server 120 may comprise a system health analyzer engine 310. The system health analyzer engine 310 may gather performance and health information about the physical servers 110 and their operating systems (e.g., hypervisors 124) that are hosting VMs 112. The information gathered may comprise, but is not limited to, processor utilization, memory utilization/overhead, input/output (TO) read/write performance, etc.

Based on the information gathered, the system health analyzer engine 310 may generate a utilization status 321, a performance recommendation 322, and an alert 323 (if appropriate) for each physical server 110. The alert 323 may comprise one or more of: a processor utilization that is too high, a memory utilization that is too high, an IO utilization that is too high, a network utilization that is too high, etc. A utilization is too high when it is above a predetermined threshold. In one embodiment, the utilization status 321, performance recommendation 322, and alert 323 may be transmitted to the backup server 130 to better assist the backup server 130 in scheduling VM 110 backups. Further, the utilization status 321, performance recommendation 322, and alert 323 may be displayed to the user so the user may perform necessary and appropriate manual intervention to resolve performance issues associated with the VM infrastructure.

For example, the backup server 130 may plan to initiate a concurrent backup of 10 VMs 110 in a particular physical server 110 according to a preset policy. However, the backup server 130 receives an alert from the system health analyzer engine 310 that the physical server 110 concerned is experiencing very high utilization and that it is recommended that no more than 2 additional sessions be spawned at the particular physical server 110. Based on the alert, the backup server 130 may initiate backing up of only 2 VMs 112 at the particular physical server 110 at this time and postpone the backups for the other 8 VMs 112. This is preferable to initiating the backing up of all 10 VM 112 because given the system restraints, initiating the backing up of all 10 VM 112 would have led to most of the backups failing.

Figure 4:
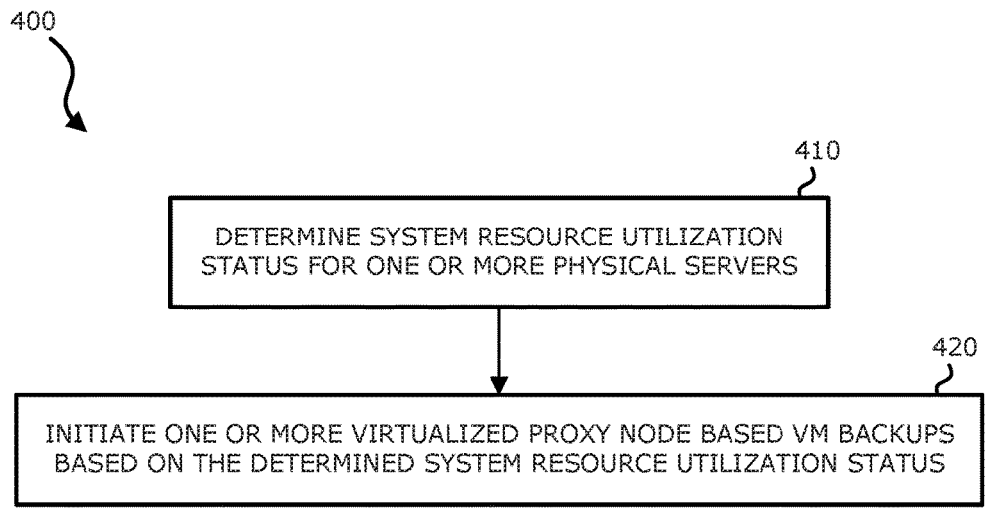
FIG. 4 is a flowchart illustrating an example method for coordinating virtualized proxy node based virtual machine backups, according to one embodiment of the invention.

Referring to FIG. 4, a flowchart illustrating an example method 400 for coordinating virtualized proxy node based virtual machine backups, according to one embodiment of the invention, is shown. At block 410, system resource utilization status for one or more physical servers may be determined. At block 420, one or more virtualized proxy node based virtual machine backups may be initiated based on the determined system resource utilization status.

Figure 5:
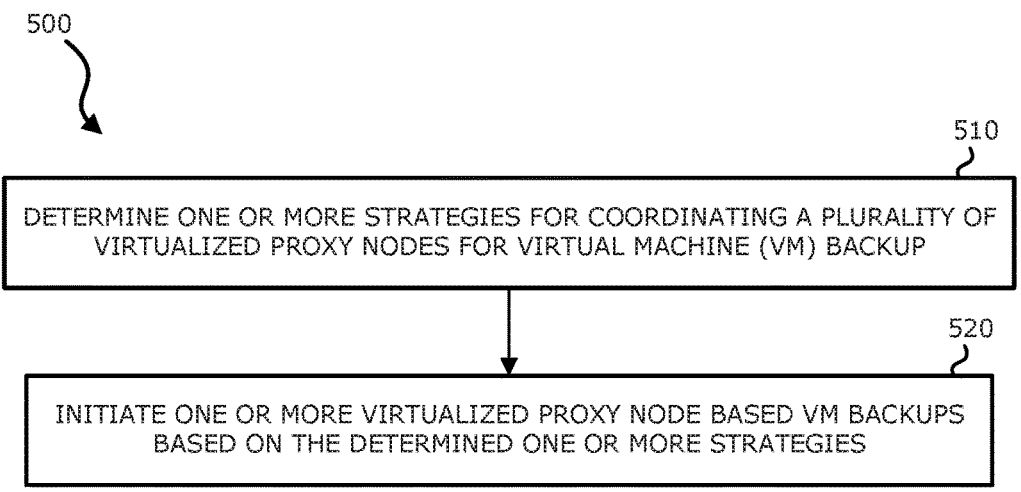
FIG. 5 is a flowchart illustrating an example method for coordinating virtualized proxy node based virtual machine backups, according to one embodiment of the invention.

Referring to FIG. 5, a flowchart illustrating an example method 500 for coordinating virtualized proxy node based virtual machine backups, according to one embodiment of the invention, is shown. At block 510, one or more strategies for coordinating a plurality of virtualized proxy nodes for virtual machine (VM) backup may be determined. At block 520, one or more virtualized proxy node based VM backups may be initiated based on the determined one or more strategies.

The one or more strategies may comprise one or more of: 1) limiting a virtualized proxy node to backing up only VMs residing in a same physical server as the virtualized proxy node; 2) migrating an idle virtualized proxy node to a physical server where one or more VMs are waiting to be backed up; 3) assigning additional VM backup tasks on a physical server to an already active virtualized proxy node residing in the same physical server first: 4) dividing VM backup tasks on a physical server equally among a plurality of virtualized proxy nodes residing in the same physical server; or 5) migrating a virtualized proxy node from a first physical server associated with a low priority level to a second physical server associated with a high priority level to back up one or more VMs residing in the second physical server, etc.

Methods 400, 500 may be performed by processing logic that includes hardware (e.g. circuitry, dedicated logic, etc.), software (e.g., embodied on a non-transitory computer readable medium), or a combination thereof. For example, methods 400, 500 may be performed by processors 1501 of FIG. 6. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the invention are related to scheduling and coordinating virtualized proxy node based virtual machine backups in an efficient manner. The scheduling and coordination of the virtualized proxy nodes may be based on a system resource utilization status. Proxy nodes may be limited to backing up only VMs residing within the same physical server. Proxy nodes may be migrated to a physical server in order to back up a VM from within the same physical server. Various strategies are disclosed that improve the efficiency of VM backups in a large VM infrastructure and reduce management difficulty.

Figure 6:
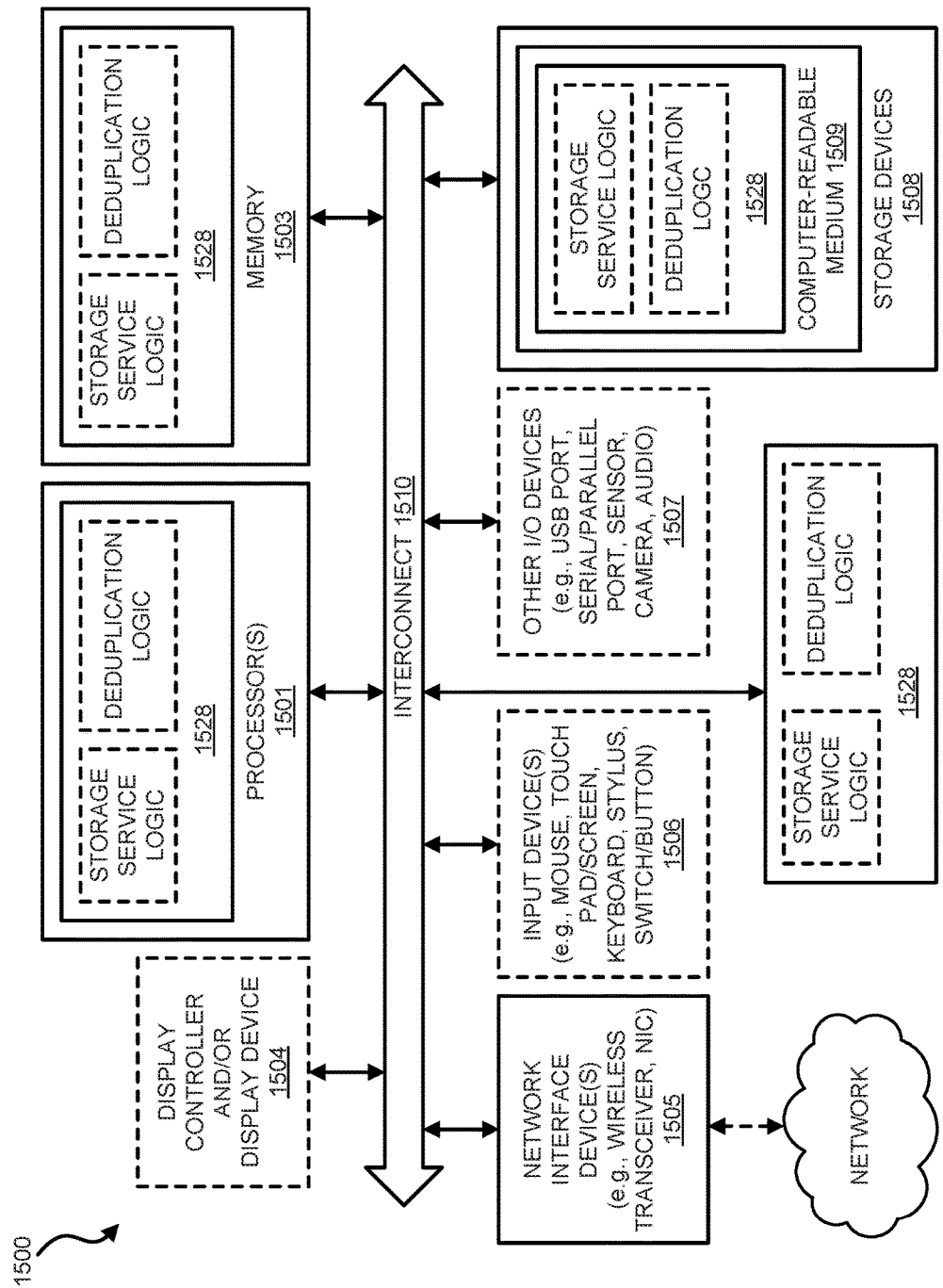
FIG. 6 is a block diagram illustrating an example of a data processing system which may be used with one embodiment of the disclosure.

FIG. 6 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for coordinating virtualized proxy node based virtual machine (VM) backups, comprising:
   determining one or more strategies for coordinating a plurality of virtualized proxy nodes for VM backup, wherein the one or more strategies comprise migrating an idle virtualized proxy node to a physical server where one or more VMs are waiting to be backed up; and
   initiating one or more virtualized proxy node based VM backups based on the determined one or more strategies.

2. The method of claim 1, wherein each virtualized proxy node is capable of backing up a plurality of VMs concurrently.

3. The method of claim 1, wherein the one or more strategies further comprise limiting a virtualized proxy node to backing up only VMs residing in a same physical server as the virtualized proxy node.

4. The method of claim 1, wherein the one or more strategies further comprise assigning additional VM backup tasks on a physical server to an already active virtualized proxy node residing in the same physical server first.

5. The method of claim 1, wherein the one or more strategies further comprise dividing VM backup tasks on a physical server equally among a plurality of virtualized proxy nodes residing in the same physical server.

6. The method of claim 1, wherein the one or more strategies further comprise migrating a virtualized proxy node from a first physical server associated with a low priority level to a second physical server associated with a high priority level to back up one or more VMs residing in the second physical server.

7. A non-transitory machine-readable medium having instructions stored therein which, when executed by a processor, cause the processor to perform backup operations, the operations comprising:
   determining one or more strategies for coordinating a plurality of virtualized proxy nodes for virtual machine (VM) backup, wherein the one or more strategies comprise migrating an idle virtualized proxy node to a physical server where one or more VMs are waiting to be backed up; and
   initiating one or more virtualized proxy node based VM backups based on the determined one or more strategies.

8. The non-transitory machine-readable medium of claim 7, wherein each virtualized proxy node is capable of backing up a plurality of VMs concurrently.

9. The non-transitory machine-readable medium of claim 7, wherein the one or more strategies further comprise limiting a virtualized proxy node to backing up only VMs residing in a same physical server as the virtualized proxy node.

10. The non-transitory machine-readable medium of claim 7, wherein the one or more strategies further comprise assigning additional VM backup tasks on a physical server to an already active virtualized proxy node residing in the same physical server first.

11. The non-transitory machine-readable medium of claim 7, wherein the one or more strategies further comprise dividing VM backup tasks on a physical server equally among a plurality of virtualized proxy nodes residing in the same physical server.

12. The non-transitory machine-readable medium of claim 7, wherein the one or more strategies further comprise migrating a virtualized proxy node from a first physical server associated with a low priority level to a second physical server associated with a high priority level to back up one or more VMs residing in the second physical server.

13. A data processing system, comprising:
   a processor; and
   a memory coupled to the processor storing instructions which, when executed by the processor, cause the processor to perform backup operations, the operations including:
      determining one or more strategies for coordinating a plurality of virtualized proxy nodes for virtual machine (VM) backup, wherein the one or more strategies comprise migrating an idle virtualized proxy node to a physical server where one or more VMs are waiting to be backed up; and initiating one or more virtualized proxy node based VM backups based on the determined one or more strategies.

14. The data processing system of claim 13, wherein each virtualized proxy node is capable of backing up a plurality of VMs concurrently.

15. The data processing system of claim 13, wherein the one or more strategies further comprise limiting a virtualized proxy node to backing up only VMs residing in a same physical server as the virtualized proxy node.

16. The data processing system of claim 13, wherein the one or more strategies further comprise assigning additional VM backup tasks on a physical server to an already active virtualized proxy node residing in the same physical server first.

17. The data processing system of claim 13, wherein the one or more strategies further comprise dividing VM backup tasks on a physical server equally among a plurality of virtualized proxy nodes residing in the same physical server.

18. The data processing system of claim 13, wherein the one or more strategies further comprise migrating a virtualized proxy node from a first physical server associated with a low priority level to a second physical server associated with a high priority level to back up one or more VMs residing in the second physical server.

19. A method for coordinating virtualized proxy node based virtual machine (VM) backups, comprising:

determining one or more strategies for coordinating a plurality of virtualized proxy nodes for VM backup, wherein the one or more strategies comprise migrating a virtualized proxy node from a first physical server associated with a low priority level to a second physical server associated with a high priority level to back up one or more VMs residing in the second physical server; and initiating one or more virtualized proxy node based VM backups based on the determined one or more strategies.

20. A non-transitory machine-readable medium having instructions stored therein which, when executed by a processor, cause the processor to perform backup operations, the operations comprising:

determining one or more strategies for coordinating a plurality of virtualized proxy nodes for virtual machine (VM) backup, wherein the one or more strategies comprise migrating a virtualized proxy node from a first physical server associated with a low priority level to a second physical server associated with a high priority level to back up one or more VMs residing in the second physical server; and initiating one or more virtualized proxy node based VM backups based on the determined one or more strategies.

21. A data processing system, comprising:

a processor; and a memory coupled to the processor storing instructions which, when executed by the processor, cause the processor to perform backup operations, the operations including:

determining one or more strategies for coordinating a plurality of virtualized proxy nodes for virtual machine (VM) backup, wherein the one or more strategies comprise migrating a virtualized proxy node from a first physical server associated with a low priority level to a second physical server associated with a high priority level to back up one or more VMs residing in the second physical server; and initiating one or more virtualized proxy node based VM backups based on the determined one or more strategies.

* * * * *